United States Patent [19]

Yoshida et al.

[11] Patent Number: 5,370,811
[45] Date of Patent: Dec. 6, 1994

[54] WORKING FLUID CONTAINING TETRAFLUOROETHANE

[75] Inventors: Yuji Yoshida, Hyogo; Koji Arita; Masami Funakura, both of Osaka, all of Japan

[73] Assignee: Matsushita Electric Industrial Co., Ltd., Japan

[21] Appl. No.: 832,649

[22] Filed: Feb. 11, 1992

Related U.S. Application Data

[63] Continuation of Ser. No. 620,887, Nov. 29, 1990, abandoned.

[30] Foreign Application Priority Data

| Nov. 30, 1989 | [JP] | Japan | 1-311154 |
| Nov. 30, 1989 | [JP] | Japan | 1-311155 |
| Nov. 30, 1989 | [JP] | Japan | 1-311157 |
| Nov. 30, 1989 | [JP] | Japan | 1-311167 |

[51] Int. Cl.$^5$ ............................................. C09K 5/04
[52] U.S. Cl. ........................................ 252/67; 62/114
[58] Field of Search ............................ 252/67; 62/114

[56] References Cited

U.S. PATENT DOCUMENTS

| 3,173,872 | 3/1965 | Broadley et al. | 252/67 |
| 3,444,085 | 5/1969 | Eiseman | 252/67 |
| 3,640,869 | 2/1972 | Orfeo et al. | 252/67 |
| 4,810,403 | 3/1989 | Bivens et al. | 252/67 |
| 4,971,712 | 11/1990 | Gorski et al. | 252/52 A |
| 5,185,094 | 2/1993 | Shiflett | 252/67 |

FOREIGN PATENT DOCUMENTS 1177916 1/1970 United Kingdom.
92/01762 2/1992 WIPO.

OTHER PUBLICATIONS

World Patent Index, Latest, accession No. 89-035371 [05], Derwent Publications Ltd. (London)-Abstract of JP-A-63 308 084, Dec. 1988.

*Primary Examiner*—Christine Skane
*Attorney, Agent, or Firm*—Wenderoth, Lind & Ponack

[57] ABSTRACT

A working fluid comprising tetrafluoroethane and at least two fluorinated hydrocarbons having a boiling point of not higher than −40° C. under atmospheric pressure selected from the group consisting of methane derivatives and ethane derivatives which consist of one or two carbon atoms, hydrogen atoms and fluorine atoms, which has very small influence on the ozone layer in the stratosphere and is suitable as a substitute working fluid for chlorodifluoromethane.

14 Claims, 12 Drawing Sheets

WORKING FLUID CONTAINING TETRAFLUOROETHANE

This application is a continuation of now abandoned application Ser. No. 07/620,887 filed on Nov. 29, 1990 abandoned.

BACKGROUND OF THE INVENTION

1. Field of the Invention

The present invention relates to a working fluid which comprises plural halogenated hydrocarbons and is used in air conditioners, heat pumps and the like.

2. Description of the Related Art

Hitherto, as working fluids in air conditioners, heat pumps and the like, are used halogenated hydrocarbons derived from methane or ethane, which are also called fluorinated halocarbons. They work at such utilization temperature that their condensation temperature and/or evaporation temperature is from about 0° (zero) to about 50° C. Among them, chlorofluoromethane ($CHClF_2$, R22) with a boiling point of −40.8° C. is widely used as a working fluid in an air conditioner for a building and a large size refridgeration system.

Recently, depletion of the ozone layer in the stratosphere with fluorinated halocarbons is seriously discussed as one of the global environmental problems, and amounts to be used and produced of some fully halogenated chlorofluorocarbons (CFCs) which have high ozone depletion potential are limited by the Montreal Protocol. In future, their use and production will be banned.

R22 has an ozone depletion potential (hereinafter referred to as "ODP") of 0.05 when ODP of trichlorofluoromethane ($CCl_3F$, R11) is defined to be 1 (one). Though R22 is not a CFC, its production and use are expected to increase and it is expected that R22 will have significant influence on living in future, since the air conditioners and the heat pumps are and will be widely used. Therefore, it is highly desired to quickly develop a working fluid which has a small ODP and can be used as a substitute for R22.

SUMMARY OF THE INVENTION

An object of the present invention is to provide a working fluid which has less influence on the ozone layer in the stratosphere and can be used as a substitute for R22.

According to the present invention, there is provided a working fluid comprising tetrafluoroethane ($C_2H_2F_4$), and at least two fluorinated hydrocarbons having a boiling point of not higher than −40° C. under atmospheric pressure selected from the group consisting of methane derivatives and ethane derivatives which consist of one or two carbon atoms, hydrogen atoms and fluorine atoms (hereinafter referred to as "fluorinated methane or ethane derivative").

DETAILED DESCRIPTION OF THE INVENTION

Among the components of the working fluid of the present invention, tetrafluoroethane has substantially no ozone depletion potential, namely its ODP is substantially zero and it contains no chlorine atom in its molecular structure.

Since the fluorinated methane or ethane derivatives have no chlorine atom in molecular structures, they have substantially no ozone depletion potential.

Among the fluorinated methane or ethane derivatives, trifluoromethane ($CHF_3$, ODP=0), difluoromethane ($CH_2F_2$, ODP=0), pentafluoroethane ($C_2HF_5$, ODP=0) and trifluoroethane ($C_2H_2F_3$, ODP=0) are preferred.

The working fluid of the present invention has a much smaller influence on the ozone layer in the stratosphere than R22, since it comprises tetrafluoroethane which has substantially no ozone depletion potential (ODP=0) and the fluorinated methane or ethane derivatives having the boiling point not higher than −40° C. which contain no chlorine atom in the molecular structure and have substantially no ozone depletion potential.

In a specific composition range, the working fluid of the present invention has substantially the same vapor pressure as R22 in temperature range between about 0° C. to about 50° C., and is suitable as a working fluid which can be used in presently used apparatuses as a substitute for R22.

The working fluid of the present invention is expected to have a very small ODP, namely substantially 0 (zero).

In addition, since the working fluid of the present invention is a non-azeotropic mixture and has a temperature gradient in the condensing and evaporating processes, a higher coefficient of performance (COP) than R22 is expected when Lorenz cycle in which a temperature difference from a heat source is decreased is assembled.

The fluorinated halocarbons having an ozone depletion potential tend to have a large global warming potential (hereinafter referred to as "GWP") when their ODP is large. Since the working fluid of the present invention comprises the above three essential components, its GWP may be substantially the same as or smaller than that of R22. Therefore, the working fluid of the present invention may have a smaller influence on global warming.

PREFERRED EMBODIMENTS OF THE INVENTION

The present invention will be illustrated by following Examples.

EXAMPLE 1

Figure 1:
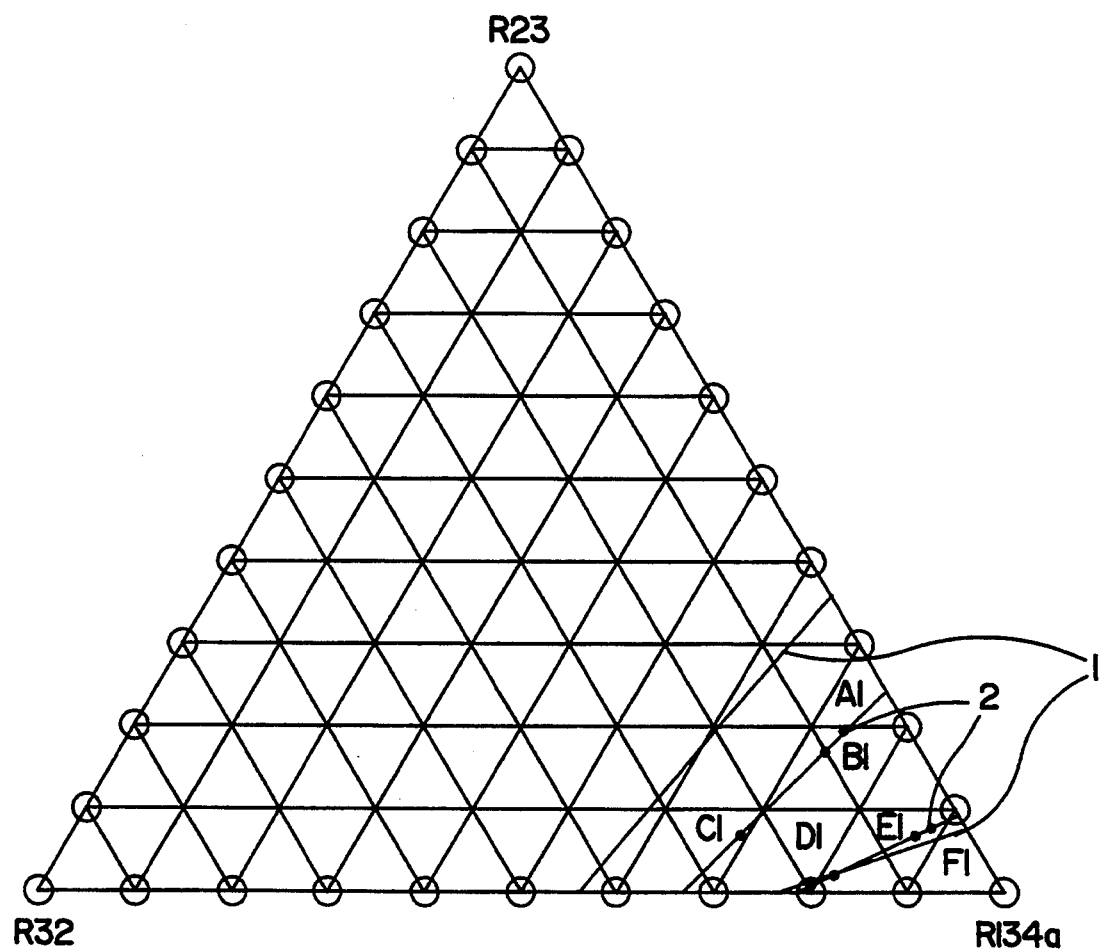
FIGS. 1 to 12 are ternary composition diagrams of the working fluids in Examples 1 to 12, respectively.

FIG. 1 shows a ternary composition diagram indicating equilibrium states of a mixture consisting of trifluoromethane (R23), difluoromethane (R32) and 1,1,1,2-tetrafluoroethane (R134a) at specific temperatures under specific pressure in a triangular coordinate.

In the triangular coordinate, in the counterclock-wise direction from the top vertex, single compounds are assigned on the vertexes from a compound having the lowest boiling point to one having the highest boiling point. A composition (weight ratio) of the three compounds at one point on the triangular coordinate is expressed by a ratio of distances between said point and the opposite sides. The distance between said point and the opposite side corresponds to a proportion of the compound which is assigned to the vertex which faces said side.

In FIG. 1, the lines 1 are phase equilibrium lines of the mixture at 0° C. under pressure of 4.044 kg/cm$^2$G. These temperatures and pressures correspond to a saturated state of R22. The upper one of the phase equilibrium lines 1 (corresponding to R22 at 0° C.) is a saturated vapor line, and the lower one is a saturated liquid line. In the area between these two lines, the mixture is in the phase equilibrium state. The lines 2 are phase equilibrium lines of the mixture at 50° C. under a pressure of 18.782 kg/cm$^2$G. These temperatures and pressures correspond to a saturated state of R22.

If R23 alone is used, it exceeds the critical temperature at 50° C. However, the mixture has the saturated state so that it can be used in the air conditioner or heat pump which has a utilization temperature range between about 0° C. and about 50° C.

As understood from FIG. 1, the mixture comprising about 0 to about 35% by weight (for example, about 1 to about 35% by weight) of R23, about 0 to about 45% by weight (for example, about 1 to about 45% by weight) of R32 and about 55 to about 95% by weight of R134a is preferred, since it has substantially the same vapor pressure as R22 in the utilization temperature range between about 0 ° C. and about 50 ° C. Further, the mixture comprising about 0 to about 25% by weight (for example, about 1 to about 25% by weight) of R23, about 0 to about 35% by weight (for example, about 1 to about 35% by weight) of R32 and about 65 to about 90 % by weight of R134a is more preferred, since it has substantially the same vapor pressure as R22 at all the utilizing temperatures between 0 ° C. and 50 ° C.

The compositions of the working fluids at the points A1 to F1 in FIG. 1 are shown in Table 1.

TABLE 1

| Point | A1 | B1 | C1 | D1 | E1 | F1 |
|---|---|---|---|---|---|---|
| R23 (wt. %) | 19.4 | 17.7 | 6.8 | 2.5 | 6.8 | 7.4 |
| R32 (wt. %) | 6.9 | 9.1 | 24.1 | 15.9 | 6.1 | 4.6 |
| R134a (wt. %) | 73.7 | 73.2 | 69.1 | 81.6 | 87.1 | 88.0 |

The points A1, B1 and C1 are on the saturated vapor line of the phase equilibrium lines 2 (corresponding to R22 at 50° C.), and the points D1, E1 and F1 are on the saturated liquid line of the phase equilibrium lines 2. Further, all of them are in the area between the saturated vapor line and the saturated liquid line of the phase equilibrium lines 1 (corresponding to R22 at 0° C.). Therefore, the mixture is in the phase equilibrium state at 0 ° C. under pressure of 4.044 kg/cm$^2$G which correspond to the saturated state of R22.

Then, the working fluid having the composition in Table 1 is in the saturated state or the phase equilibrium state under the saturated vapor pressure condition of R22 at 0° C. and 50° C., so that, in the utilization temperature range between about 0° C. and about 50° C., the working fluid has substantially the same condensation and evaporation temperatures as R22 when operated under the saturated vapor pressure of R22 at said temperatures.

In the above, the mixtures having the compositions on the phase equilibrium lines 2 (corresponding to R22 at 50° C.) have been explained. In addition, when working fluids having compositions in the area inside the points A1 to F1, namely those having compositions which realize the phase equilibrium states at 0° C. under pressure of 4.044 kg/cm$^2$G and at 50° C. under pressure of 18,782 kg/cm$^2$G both corresponding to the saturated state of R22 are operated in the similar way to the above, condensation and evaporation temperatures which are substantially the same as those of R22 can be achieved in the utilization temperature range between about 0° C. and about 50° C.

EXAMPLE 2

Figure 2:
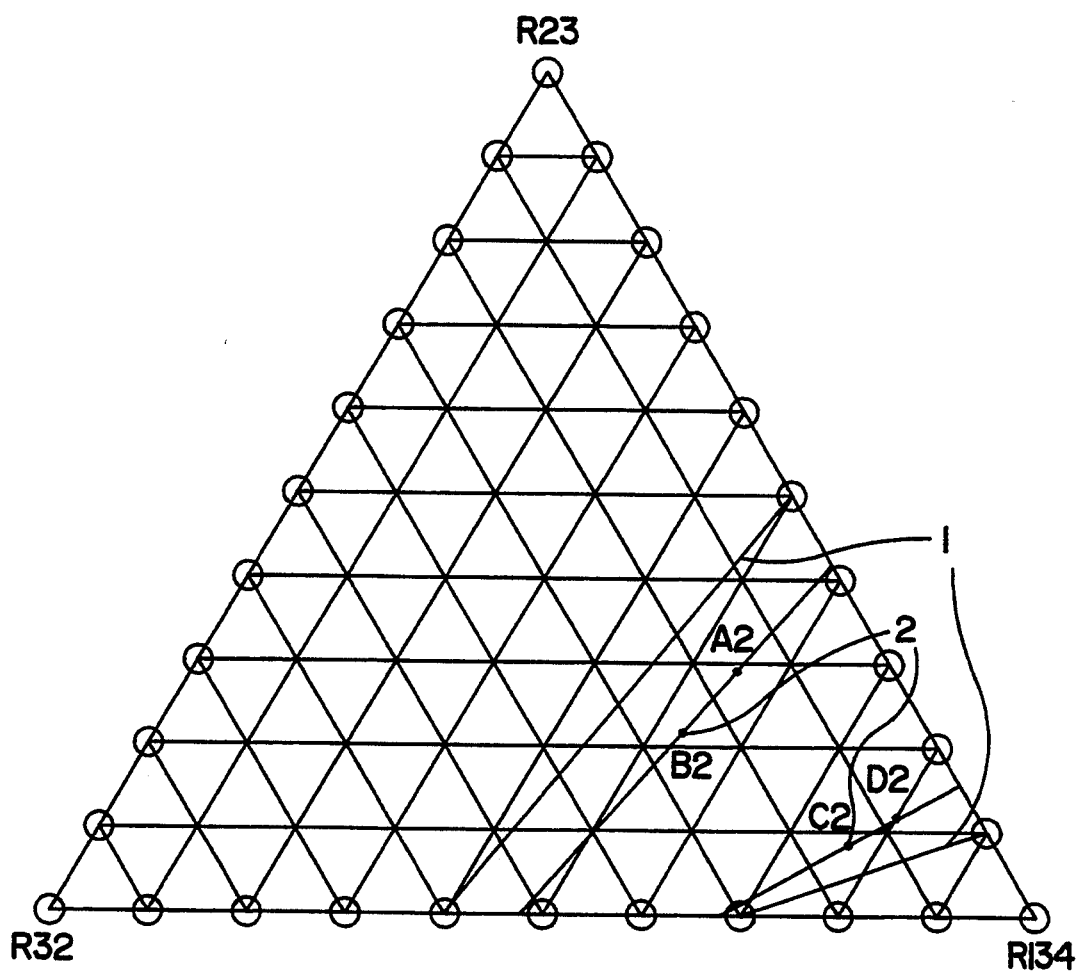

FIG. 2 shows a ternary composition diagram indicating equilibrium states of a mixture consisting of R23, R32 and 1,1,2,2-tetrafluoroethane (R134) at specific temperatures under specific pressure in a triangular coordinate. In FIG. 2, the lines 1 are phase equilibrium lines of the mixture at 0° C. under pressure of 4.044 kg/cm$^2$G and the lines 2 are phase equilibrium lines of the mixture at 50° C. under pressure of 18.782 kg/cm$^2$G.

As understood from FIG. 2, the mixture comprising about 0 to about 50% by weight (for example, about 1 to about 50% by weight) of R23, about 0 to about 60% by weight (for example, about 1 to about 60% by weight) of R32 and about 40 to about 90% by weight of R134 is preferred, since it has substantially the same vapor pressure as R22. Further, the mixture comprising about 0 to about 40% by weight (for example, about 1 to about 40% by weight) of R23, about 0 to about 50% by weight (for example, about 1 to about 50% by weight) of R32 and about 50 to about 85% by weight of R134 is more preferred.

The compositions of the working fluids at the points A1 to D1 in FIG. 2 are shown in Table 2.

TABLE 2

| Point | A2 | B2 | C2 | D2 |
|---|---|---|---|---|
| R23 (wt. %) | 28.9 | 22.5 | 8.1 | 10.5 |
| R32 (wt. %) | 15.1 | 23.2 | 14.8 | 9.6 |
| R134 (wt. %) | 56.0 | 54.3 | 77.1 | 79.9 |

The points A2 and B2 are on the saturated vapor line of the phase equilibrium lines 2 (corresponding to R22 at 50° C.), and the points C2 and D2 are on the saturated liquid line of the phase equilibrium lines 2. Further, all of them are in the area between the saturated vapor line and the saturated liquid line of the phase equilibrium lines 1 (corresponding to R22 at 0° C.). Therefore, the mixture is in the phase equilibrium state at 0° C. under pressure of 4.044 kg/cm$^2$G which correspond to the saturated state of R22.

Then, the working fluid having the composition in Table 2 is in the saturated state or the phase equilibrium state under the saturated vapor pressure condition of R22 at 0° C. and 50° C., so that, in the utilization temperature range between about 0° C. and about 50° C., the working fluid has substantially the same condensation and evaporation temperatures as R22 when operated under the saturated vapor pressure of R22 at said temperatures.

In the above, the mixtures having the compositions on the phase equilibrium lines 2 (corresponding to R22 at 50° C.) have been explained. In addition, when working fluids having compositions in the area inside the points A2 to D2, namely those having compositions which realize the phase equilibrium states at 0° C. under pressure of 4.044 kg/cm$^2$G and at 50° C. under pressure of 18.782 kg/cm$^2$G both corresponding to the saturated state of R22 are operated in the similar way to the above, condensation and evaporation temperatures which are substantially the same as those of R22 can be achieved in the utilization temperature range between about 0° C. and about 50° C.

As understood from FIGS. 1 and 2, the mixture comprising about 0 to about 50% by weight (for example, about 1 to about 50% by weight) of R23, about 0 to about 60% by weight (for example, about 1 to about 60% by weight) of R32 and about 40 to about 95% by weight of tetrafluoroethane is preferred, since it has substantially the same vapor pressure as R22 in the utilization temperature between about 0° C. and about 50° C. Further, the mixture comprising about 0 to about 40% by weight (for example, about 1 to about 40% by weight) of R23, about 0 to about 50% by weight (for example, about 1 to about 50% by weight) of R32 and about 50 to about 90% by weight of tetrafluoroethane is more preferred, since it has substantially the same vapor pressure as R22 at all the utilizing temperatures between 0° C. and 50° C.

Since the working fluids in Examples 1 and 2 are expected to have the ODP of 0 (zero), they are very promising as substitute working fluids for R22.

EXAMPLE 3

Figure 3:
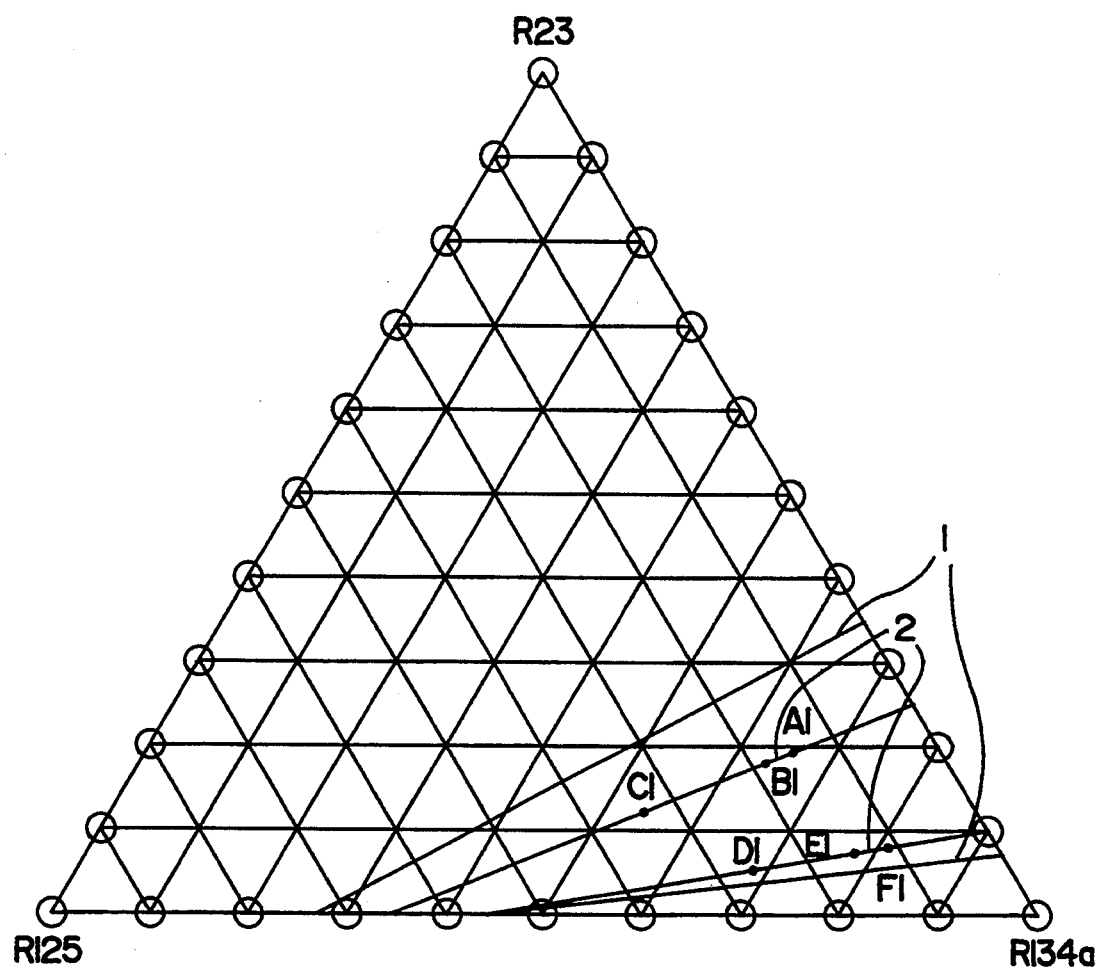

FIG. 3 shows a ternary composition diagram indicating equilibrium states of a mixture consisting of R23, pentafluoroethane (R125) and R134a at specific temperatures under specific pressure in a triangular coordinate.

The compositions of the working fluids at the points A1 to F1 in FIG. 3 are shown in Table 3.

TABLE 3

| Point | A1 | B1 | C1 | D1 | E1 | F1 |
|---|---|---|---|---|---|---|
| R23 (wt. %) | 19.2 | 17.1 | 12.5 | 5.2 | 6.9 | 7.7 |
| R125 (wt. %) | 13.7 | 19.1 | 31.6 | 25.9 | 15.3 | 10.8 |
| R134a (wt. %) | 67.1 | 63.8 | 55.9 | 68.9 | 77.9 | 81.5 |

In this case, the mixture comprising about 0 to about 35% by weight (for example, about 1 to about 35% by weight) of R23, about 0 to about 75% by weight (for example, about 1 to about 75% by weight) of R125 and about 25 to about 95% by weight of R134a is preferred, and further, the mixture comprising about 0 to about 25% by weight (for example, about 1 to about 25% by weight) of R23, about 0 to about 65% by weight (for example, about 1 to about 65% by weight) of R125 and about 35 to about 90% by weight of R134a is more preferred.

EXAMPLE 4

Figure 4:
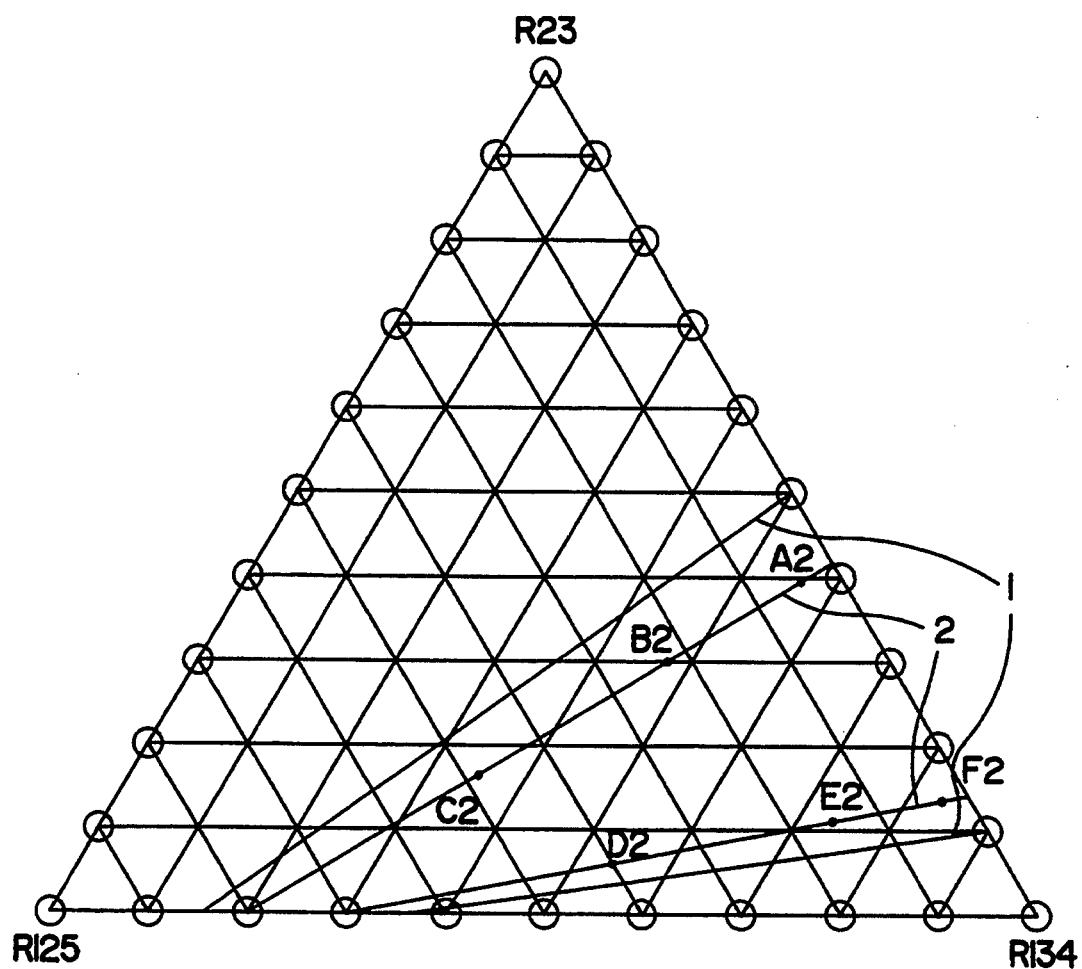

FIG. 4 shows a ternary composition diagram indicating equilibrium states of a mixture consisting of R23, R125 and R134 at specific temperatures under specific pressure in a triangular coordinate.

The compositions of the working fluids at the points A2 to F2 in FIG. 4 are shown in Table 4.

TABLE 4

| Point | A2 | B2 | C2 | D2 | E2 | F2 |
|---|---|---|---|---|---|---|
| R23 (wt. %) | 39.0 | 30.1 | 15.9 | 6.6 | 11.7 | 14.6 |
| R125 (wt. %) | 3.6 | 20.9 | 48.8 | 40.0 | 16.2 | 2.7 |
| R134 (wt. %) | 57.4 | 49.0 | 35.3 | 53.4 | 72.1 | 82.7 |

In this case, the mixture comprising about 0 to about 50% by weight (for example, about 1 to about 50% by weight) of R23, about 0 to about 85% by weight (for example, about 1 to about 85% by weight) of R125 and about 15 to about 90% by weight of R134 is preferred, and further, the mixture comprising about 0 to about 40% by weight (for example, about 1 to about 40% by weight) of R23, about 0 to about 80% by weight (for example, about 1 to about 80% by weight) of R125 and about 20 to about 85% by weight of R134 is more preferred.

As understood from FIGS. 3 and 4, the mixture comprising about 0 to about 50% by weight (for example, about 1 to about 50% by weight) of R23, about 0 to about 85% by weight (for example, about 1 to about 85% by weight) of R125 and about 15 to about 95% by weight of tetrafluoroethane is preferred, since it has substantially the same vapor pressure as R22 in the utilization temperature between about 0° C. and about 50° C. Further, the mixture comprising about 0 to about 40% by weight (for example, about 1 to about 40% by weight) of R23, about 0 to about 80% by weight (for example, about 1 to about 80% by weight) of R125 and about 20 to about 90% by weight of tetrafluoroethane is more preferred, since it has substantially the same vapor pressure as R22 at all the utilizing temperature between 0° C. and 50° C.

Since the working fluids in Examples 3 and 4 are expected to have the ODP of 0 (zero), they are very promising as substitute working fluids for R22.

EXAMPLE 5

Figure 5:
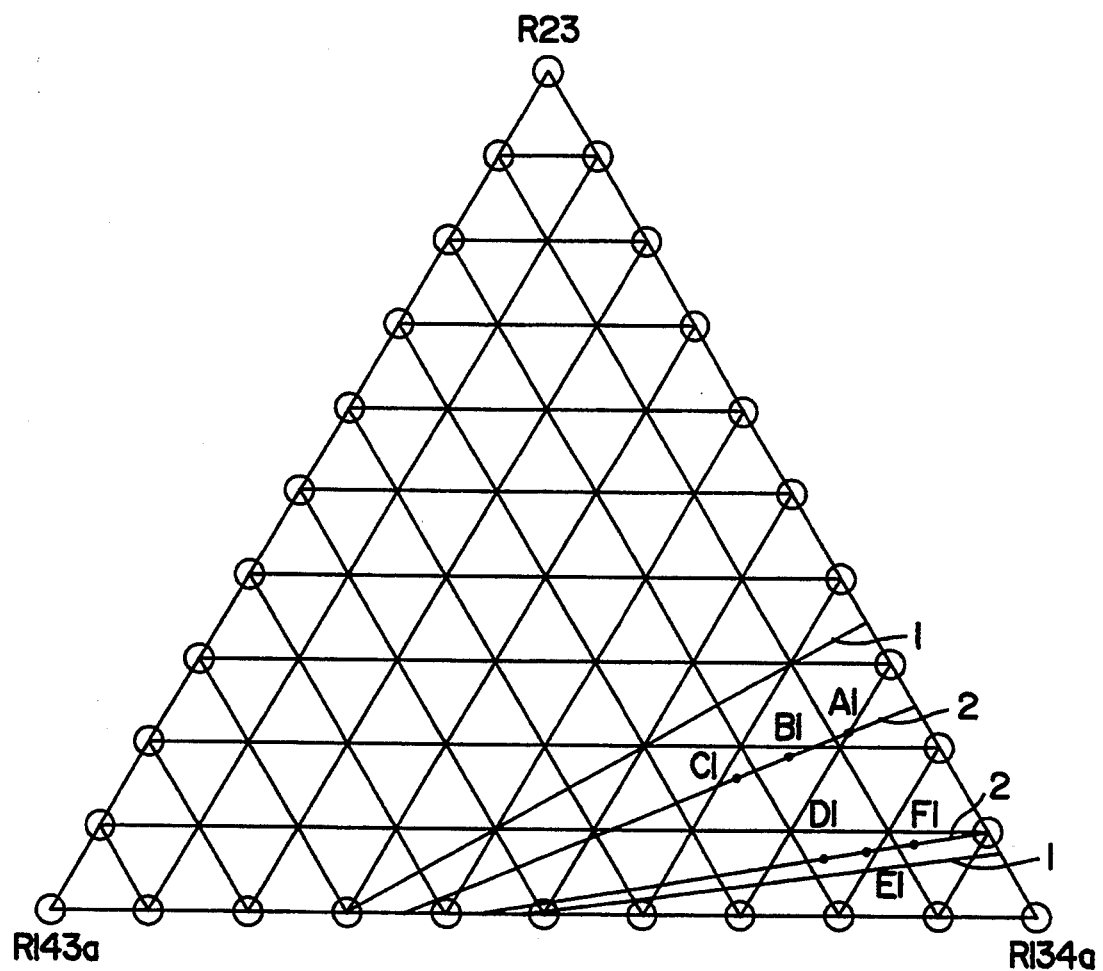

FIG. 5 shows a ternary composition diagram indicating equilibrium states of a mixture consisting of R23, 1,1,1-trifluoroethane (R143a) and R134a at specific temperatures under specific pressure in a triangular coordinate.

The compositions of the working fluids at the points A1 to F1 in FIG. 5 are shown in Table 5.

TABLE 5

| Point | A1 | B1 | C1 | D1 | E1 | F1 |
|---|---|---|---|---|---|---|
| R23 (wt. %) | 20.9 | 18.2 | 15.8 | 6.4 | 7.3 | 8.2 |
| R143a (wt. %) | 9.0 | 15.9 | 22.3 | 18.8 | 13.2 | 7.5 |
| R134a (wt. %) | 70.1 | 65.9 | 61.9 | 74.8 | 79.5 | 84.3 |

In this case, the mixture comprising about 0 to about 35% by weight (for example, about 1 to about 35% by weight) of R23, about 0 to about 70% by weight (for example, about 1 to about 70% by weight) of R143a and about 30 to about 95% by weight of R134a is preferred, and further, the mixture comprising about 0 to about 25% by weight (for example, about 1 to about 25% by weight) of R23, about 0 to about 65% by weight (for example, about 1 to about 65% by weight) of R143a and about 35 to about 90% by weight of R134a is more preferred.

EXAMPLE 6

Figure 6:
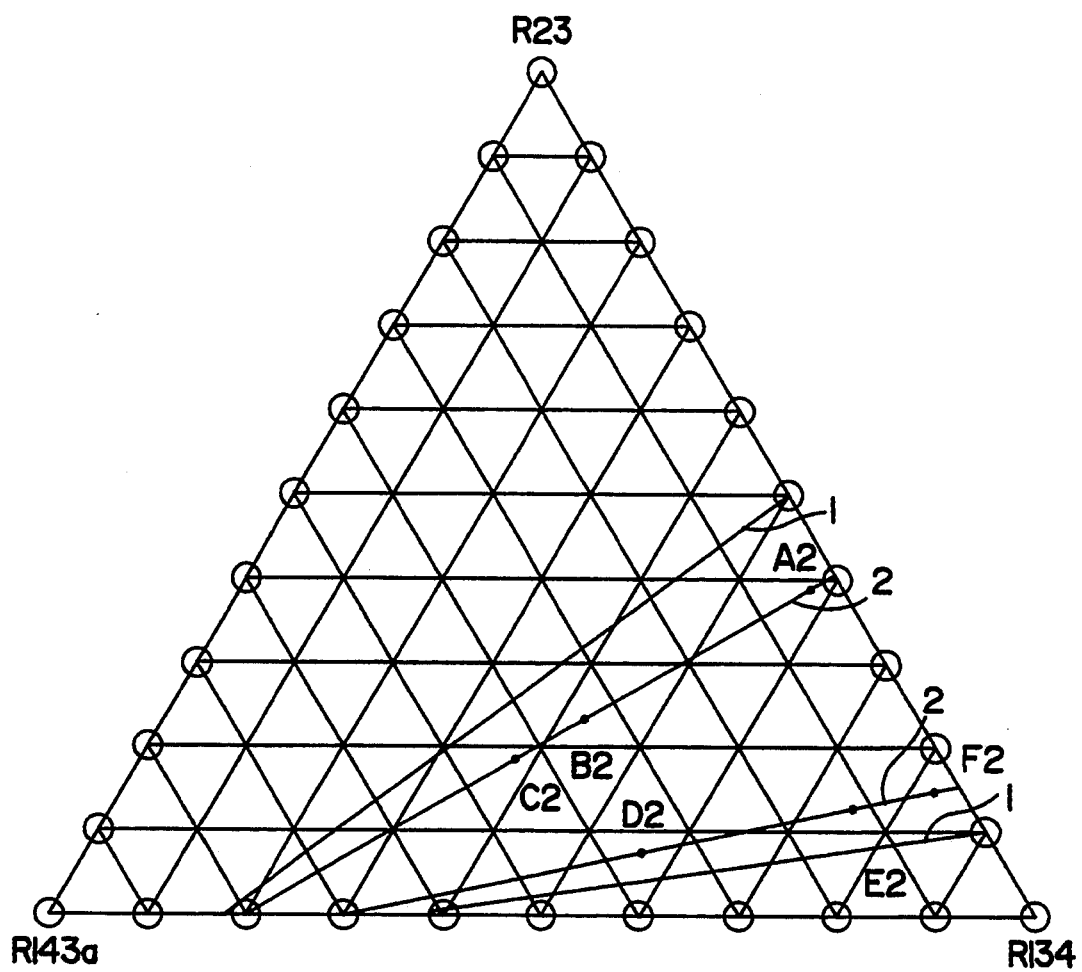

FIG. 6 shows a ternary composition diagram indicating equilibrium states of a mixture consisting of R23, R143a and R134 at specific temperatures under specific pressure in a triangular coordinate.

The compositions of the working fluids at the points A2 to F2 in FIG. 6 are shown in Table 6.

TABLE 6

| Point | A2 | B2 | C2 | D2 | E2 | F2 |
|---|---|---|---|---|---|---|
| R23 (wt. %) | 39.5 | 33.4 | 18.7 | 7.6 | 12.8 | 14.7 |
| R143a (wt. %) | 2.7 | 14.2 | 42.7 | 35.7 | 11.4 | 2.1 |
| R134 (wt. %) | 57.8 | 52.4 | 38.6 | 56.7 | 75.8 | 83.2 |

In this case, the mixture comprising about 0 to about 50% by weight (for example, about 1 to about 50% by weight) of R23, about 0 to about 80% by weight (for example, about 1 to about 80% by weight) of R143a and about 20 to about 90% by weight of R134 is preferred, and further, the mixture comprising about 0 to about 40% by weight (for example, about 1 to about 40% by weight) of R23, about 0 to about 80% by weight (for example, about 1 to about 80% by weight) of R143a and about 20 to about 85% by weight of R134 is more preferred.

As understood from FIGS. 5 and 6, the mixture comprising about 0 to about 50% by weight (for example, about 1 to about 50% by weight) of R23, about 0 to about 80 by weight (for example, about 1 to about 80% by weight) of R143a and about 20 to about 95% by weight of tetrafluoroethane is preferred, since it has substantially the same vapor pressure as R22 in the utilization temperature between about 0° C. and about 50° C. Further, the mixture comprising about 0 to about 40% by weight (for example, about 1 to about 40% by weight) of R23, about 0 to about 80 by weight (for example, about 1 to about 80% by weight) of R143a and about 20 to about 90% by weight of tetrafluoroethane is more preferred, since it has substantially the same vapor pressure as R22 at all utilizing temperature between 0° and 50° C.

Since the working fluids in Examples 5 and 6 are expected to have the ODP of 0 (zero), they are very promising as substitute working fluids for R22.

EXAMPLE 7

Figure 7:
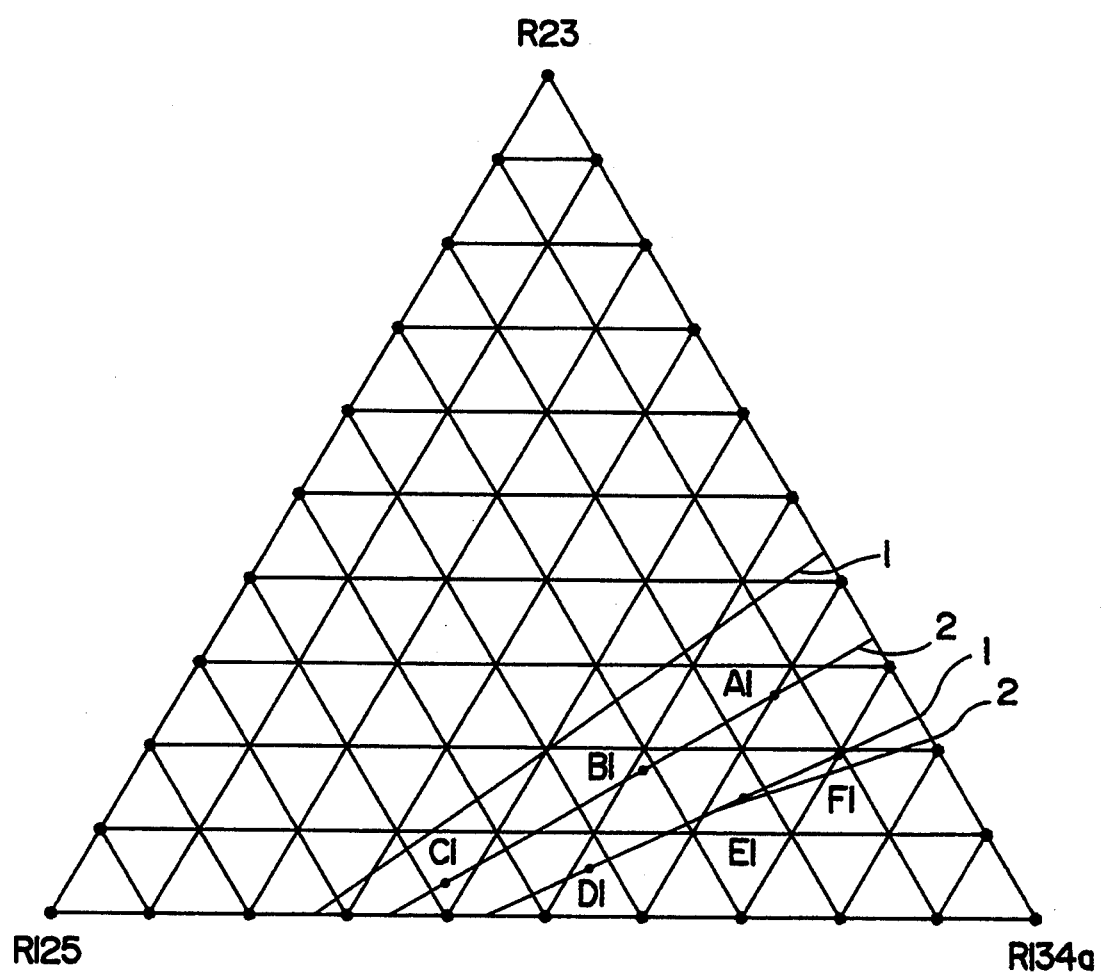

FIG. 7 shows a ternary composition diagram indicating equilibrium states of a mixture consisting of R32, R125 and R134a at specific temperatures under specific pressure in a triangular coordinate.

In FIG. 7, the lines 1 are phase equilibrium lines of the mixture at 0° C. under pressure of 4.044 kg/cm$^2$G. These temperature and pressure correspond to a saturated state of R22. The upper one of the phase equilibrium lines 1 (corresponding to R22 at 0° C.) is a saturated vapor line, and the lower one is a saturated liquid line. In the area between these two lines, the mixture is in the phase equilibrium state. The lines 2 are phase equilibrium lines of the mixture at 50° C. under pressure of 18.782 kg/cm$^2$G. These temperatures and pressures correspond to a saturated state of R22.

As understood from FIG. 7, the mixture comprising about 0 to about 45% by weight (for example, about 1 to about 45% by weight) of R32, about 0 to about 75% by weight (for example, about 1 to about 75% by weight) of R125 and about 25 to about 80% by weight of R134a is preferred, since it has substantially the same vapor pressure as R22 in the temperature range between about 0° C. and about 50° C. Further, the mixture comprising about 0 to about 35% by weight (for example, about 1 to about 35% by weight) of R32, about 0 to about 65% by weight (for example, about 1 to about 65% by weight) of R125 and about 35 to about 75% by weight of R134a is more preferred, since it has substantially the same vapor pressure as R22 at all the utilizing temperatures between 0° C. and 50° C.

The compositions of the working fluids at the points A1 to F1 in FIG. 1 are shown in Table 7.

TABLE 7

| Point | A1 | B1 | C1 | D1 | E1 | F1 |
|---|---|---|---|---|---|---|
| R32 (wt. %) | 26.2 | 17.0 | 3.5 | 5.0 | 12.4 | 18.0 |
| R125 (wt. %) | 13.8 | 31.6 | 58.7 | 43.3 | 25.4 | 12.8 |
| R134a (wt. %) | 60.0 | 51.4 | 37.8 | 51.7 | 62.2 | 69.2 |

Since the points A1, B1 and C1 are on the saturated vapor line of the phase equilibrium lines 2 (corresponding to R22 at 50° C.) and in the area between the saturated vapor line and the saturated liquid line of the phase equilibrium lines 1 (corresponding to R22 at 0° C.), the mixture is in the phase equilibrium state at 0° C. under pressure of 4.044 kg/cm$^2$G which correspond to the saturated state of R22. Also, since the points D1, E1 and F1 are on the saturated liquid line of the phase equilibrium lines 1 (corresponding to R22 at 0° C.) and in the area between the saturated vapor line and the saturated liquid line of the phase equilibrium lines 2 (corresponding to R22 at 50° C.). the mixture is in the phase equilibrium state at 50° C. under pressure of 18.782 kg/cm$^2$G which correspond to the saturated state of R22.

Then, the working fluid having the composition in Table 7 is in the saturated state or the phase equilibrium state under the saturated vapor pressure condition of R22 at 0° C. and 50° C., so that, in the utilization temperature range between about 0° C. and about 50° C., the working fluid has substantially the same condensation and evaporation temperatures as R22 when operated under the saturated vapor pressure of R22 at said temperatures.

In the above, the mixtures having the compositions on the phase equilibrium lines 1 or 2 (corresponding to R22 at 0° C. or 50° C.) have been explained. In addition, when working fluids having compositions in the area inside the points A1 to F1, namely those having compositions which realize the phase equilibrium states at 0° C. under pressure of 4.044 kg/cm$^2$G and at 50° C. under pressure of 18.782 kg/cm$^2$G both corresponding to the saturated state of R22 are operated in the similar way to the above, condensation and evaporation temperatures which are substantially the same as those of R22 can be achieved in the utilization temperature range between about 0° C. and about 50° C.

EXAMPLE 8

Figure 8:
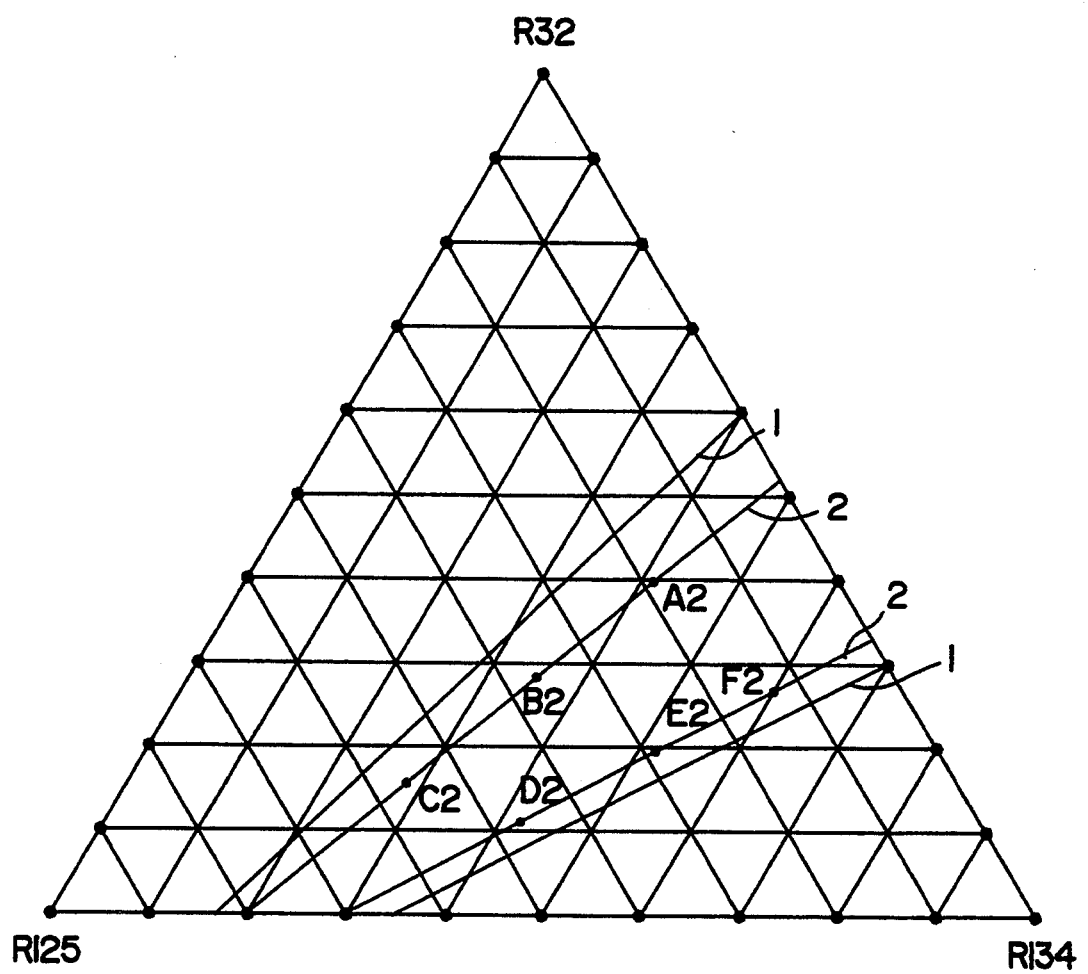

FIG. 8 shows a ternary composition diagram indicating equilibrium states of a mixture consisting of R32, R125 and R134 at specific temperatures under specific pressure in a triangular coordinate. In FIG. 8, the lines 1 are phase equilibrium lines of the mixture at 0° C. under pressure of 4.044 kg/cm$^2$G, and the lines 2 are phase equilibrium lines of the mixture at 50° C. under pressure of 18.782 kg/cm$^2$G.

As understood from FIG. 2, the mixture comprising about 0 to about 60% by weight (for example, about 1 to about 60% by weight) of R32, about 0 to about 85% by weight (for example, about 1 to about 85% by weight) of R125 and about 15 to about 70% by weight of R134 is preferred, since it has substantially the same vapor pressure as R22. Further, the mixture comprising about 0 to about 50% by weight (for example, about 1 to about 50% by weight) of R32, about 0 to about 80% by weight (for example, about 1 to about 80% by weight) of R125 and about 20 to about 65% by weight of R134 is more preferred.

The compositions of the working fluids at the points A2 to F2 in FIG. 8 are shown in Table 8.

TABLE 8

| Point | A2 | B2 | C2 | D2 | E2 | F2 |
|---|---|---|---|---|---|---|
| R32 (wt. %) | 39.1 | 28.9 | 15.0 | 10.5 | 19.4 | 25.4 |
| R125 (wt. %) | 19.3 | 34.8 | 56.6 | 46.3 | 27.0 | 14.4 |
| R134 (wt. %) | 41.6 | 36.3 | 28.4 | 43.2 | 53.6 | 60.2 |

The points A2, B2 and C2 are on the saturated vapor line of the phase equilibrium lines 2 (corresponding to R22 at 50° C.), and the points D2, E2 and F2 are on the saturated liquid line of the phase equilibrium lines 2. Further, all of them are in the area between the saturated vapor line and the saturated liquid line of the phase equilibrium lines 1 (corresponding to R22 at 0° C.). Therefore, the mixture is in the phase equilibrium state at 0° C. under pressure of 4.044 kg/cm²G which correspond to the saturated state of R22.

Then, the working fluid having the composition in Table 8 is in the saturated state or the phase equilibrium state under the saturated vapor pressure condition of R22 at 0° C. and 50° C., so that, in the utilization temperature range between about 0° C. and about 50° C., the working fluid has substantially the same condensation and evaporation temperatures as R22 when operated under the saturated vapor pressure of R22 at said temperatures.

In the above, the mixtures having the compositions on the phase equilibrium lines 2 (corresponding to R22 at 50° C.) have been explained. In addition, when working fluids having compositions in the area inside the points A2 to F2, namely those having compositions which realize the phase equilibrium states at 0° C. under pressure of 4.044 kg/cm²G and at 50° C. under pressure of 18.782 kg/cm²G both corresponding to the saturated state of R22 are operated in the similar way to the above, condensation and evaporation temperatures which are substantially the same as those of R22 can be achieved in the utilization temperature range between about 0° C. and about 50° C.

As understood from FIGS. 7 and 8, the mixture comprising about 0 to about 60% by weight (for example, about 1 to about 60% by weight) of R32, about 0 to about 85% by weight (for example, about 1 to about 85% by weight) of R125 and about 15 to about 80% by weight of tetrafluoroethane is preferred, since it has substantially the same vapor pressure as R22. Further, the mixture comprising about 0 to about 50% by weight (for example, about 1 to about 50% by weight) of R32, about 0 to about 80% by weight (for example, about 1 to about 80% by weight) of R125 and about 20 to about 75% by weight of tetrafluoroethane is more preferred, since it has substantially the same vapor pressure as R22 at all the utilizing temperatures between 0° C. and 50° C.

Since the working fluids in Examples 7 and 8 are expected to have the ODP of 0 (zero), they are very promising as substitute working fluids for R22.

EXAMPLE 9

Figure 9:
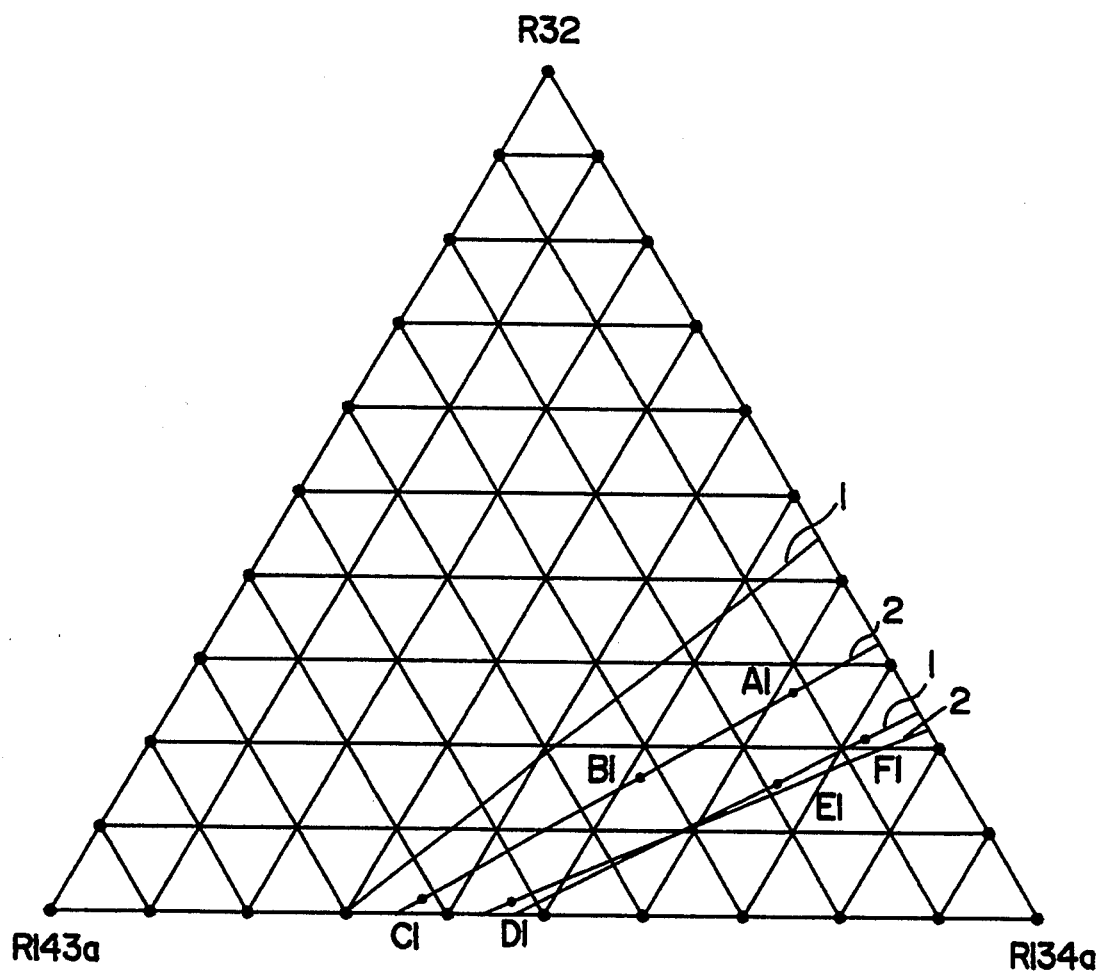

FIG. 9 shows a ternary composition diagram indicating equilibrium states of a mixture consisting of R32, R143a and R134a at specific temperatures under specific pressure in a triangular coordinate.

The compositions of the working fluids at the points A1 to F1 in FIG. 9 are shown in Table 9.

TABLE 9

| Point | A1 | B1 | C1 | D1 | E1 | F1 |
|---|---|---|---|---|---|---|
| R32 (wt. %) | 27.4 | 15.3 | 1.8 | 1.3 | 14.7 | 20.9 |
| R143a (wt. %) | 11.2 | 34.3 | 61.4 | 53.6 | 19.5 | 6.2 |
| R134a (wt. %) | 61.4 | 50.4 | 36.8 | 45.1 | 65.8 | 72.9 |

In this case, the mixture comprising about 0 to about 45% by weight (for example, about 1 to about 45% by weight) of R32, about 0 to about 70% by weight (for example, about 1 to about 70% by weight) of R143a and about 30 to about 80% by weight of R134a is preferred, and further, the mixture comprising about 0 to about 35% by weight (for example, about 1 to about 35% by weight) of R32, about 0 to about 65% by weight (for example, about 1 to about 65% by weight) of R143a and about 35 to about 75% by weight of R134a is more preferred.

EXAMPLE 10

Figure 10:
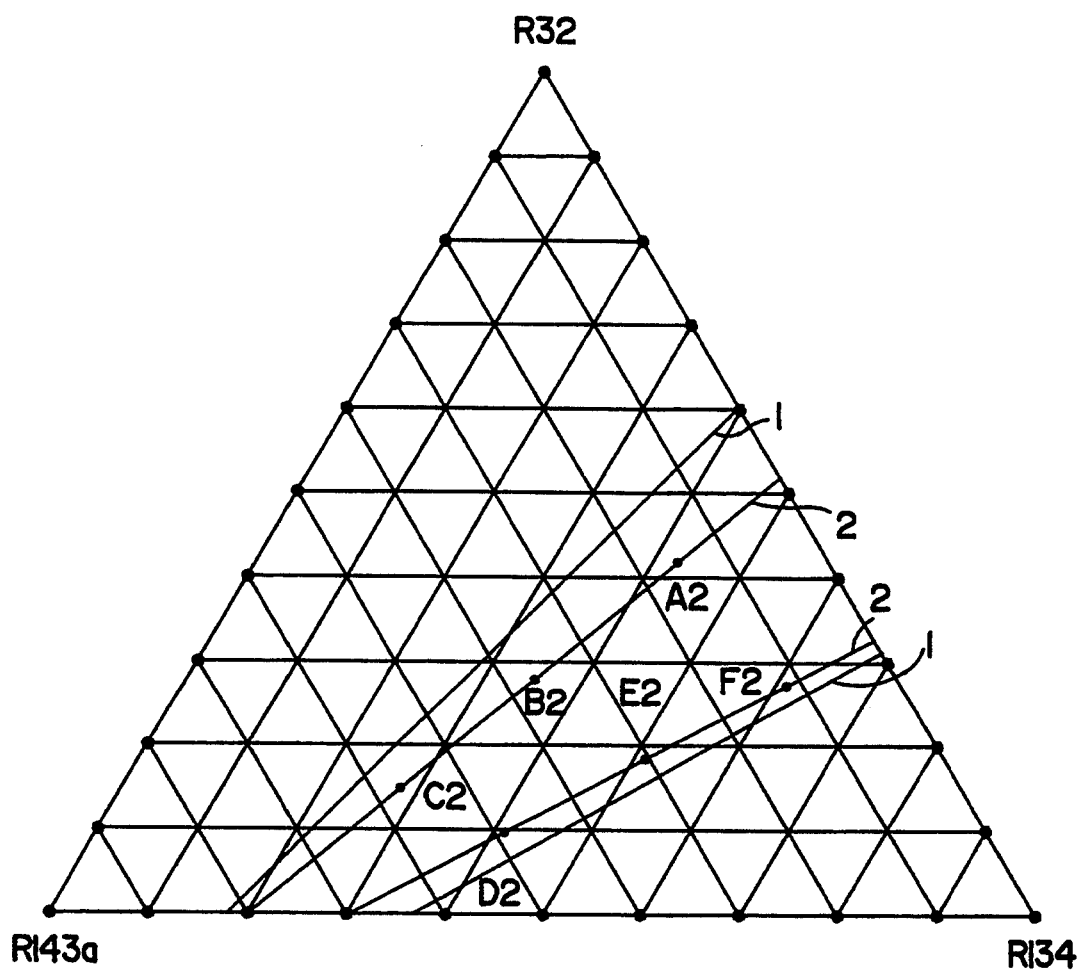

FIG. 10 shows a ternary composition diagram indicating equilibrium states of a mixture consisting of R32, R143a and R134 at specific temperatures under specific pressure in a triangular coordinate.

The compositions of the working fluids at the points A2 to F2 in FIG. 10 are shown in Table 10.

TABLE 10

| Point | A2 | B2 | C2 | D2 | E2 | F2 |
|---|---|---|---|---|---|---|
| R32 (wt. %) | 40.6 | 26.8 | 13.5 | 9.3 | 17.8 | 26.1 |
| R143a (wt. %) | 16.8 | 37.7 | 58.3 | 49.2 | 30.5 | 13.0 |
| R134 (wt. %) | 42.6 | 35.5 | 28.2 | 41.5 | 51.7 | 60.9 |

In this case, the mixture comprising about 0 to about 60% by weight (for example, about 1 to about 60% by weight) of R32, about 0 to about 80% by weight (for example, about 1 to about 80% by weight) of R143a and about 20 to about 70% by weight of R134 is preferred, and further, the mixture comprising about 0 to about 50% by weight (for example, about 1 to about 50% by weight) of R32, about 0 to about 80% by weight (for example, about 1 to about 80% by weight) of R143a and about 20 to about 65% by weight of R134 is more preferred.

As understood from FIGS. 9 and 10, the mixture comprising about 0 to about 60% by weight (for example, about 1 to about 60% by weight) of R32, about 0 to about 80% by weight (for example, about 1 to about 80% by weight) of R143a and about 20 to about 80% by weight of tetrafluoroethane is preferred, since it has substantially the same vapor pressure as R22 in the utilization temperature between about 0° C. and about 50° C. Further, the mixture comprising about 0 to about 50% by weight (for example, about 1 to about 50% by weight) of R32, about 0 to about 80% by weight (for example, about 1 to about 80% by weight) of R143a and about 20 to about 75% by weight of tetrafluoroethane is more preferred, since it has substantially the same vapor pressure as R22 at all the utilizing temperatures between 0° C. and 50° C.

Since the working fluids in Examples 9 and 10 are expected to have the ODP of 0 (zero), they are very promising as substitute working fluids for R22.

EXAMPLE 11

Figure 11:
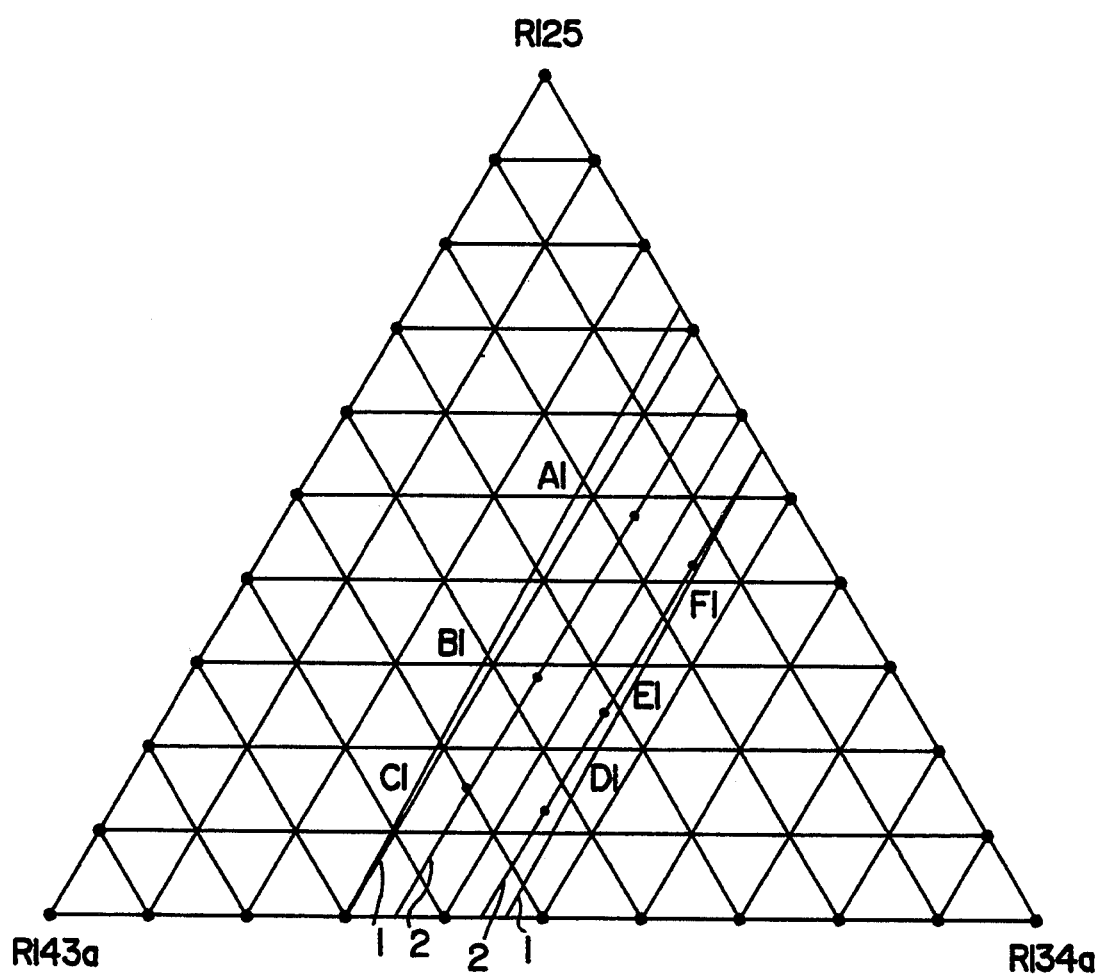

FIG. 11 shows a ternary composition diagram indicating equilibrium states of a mixture consisting of R125, R143a and R134a at specific temperatures under specific pressure in a triangular coordinate.

The compositions of the working fluids at the points A1 to F1 in FIG. 11 are shown in Table 11.

TABLE 11

| Point | A1 | B1 | C1 | D1 | E1 | F1 |
|---|---|---|---|---|---|---|
| R125 (wt. %) | 48.0 | 28.6 | 15.3 | 12.9 | 24.3 | 41.2 |
| R143a (wt. %) | 17.8 | 36.9 | 50.1 | 44.3 | 32.9 | 16.0 |
| R134a (wt. %) | 34.2 | 34.5 | 34.6 | 42.8 | 42.8 | 42.8 |

In this case, the mixture comprising about 0 to about 75% by weight (for example, about 1 to about 75% by weight) of R125, about 0 to about 70% by weight (for example, about 1 to about 70% by weight) of R143a and about 25 to about 45% by weight of R134a is preferred, and further, the mixture comprising about 0 to about 65% by weight (for example, about 1 to about 65% by weight) of R125, about 0 to about 65% by weight (for example, about 1 to about 65% by weight) of R143a and about 35 to about 45% by weight of R134a is more preferred.

EXAMPLE 12

Figure 12:
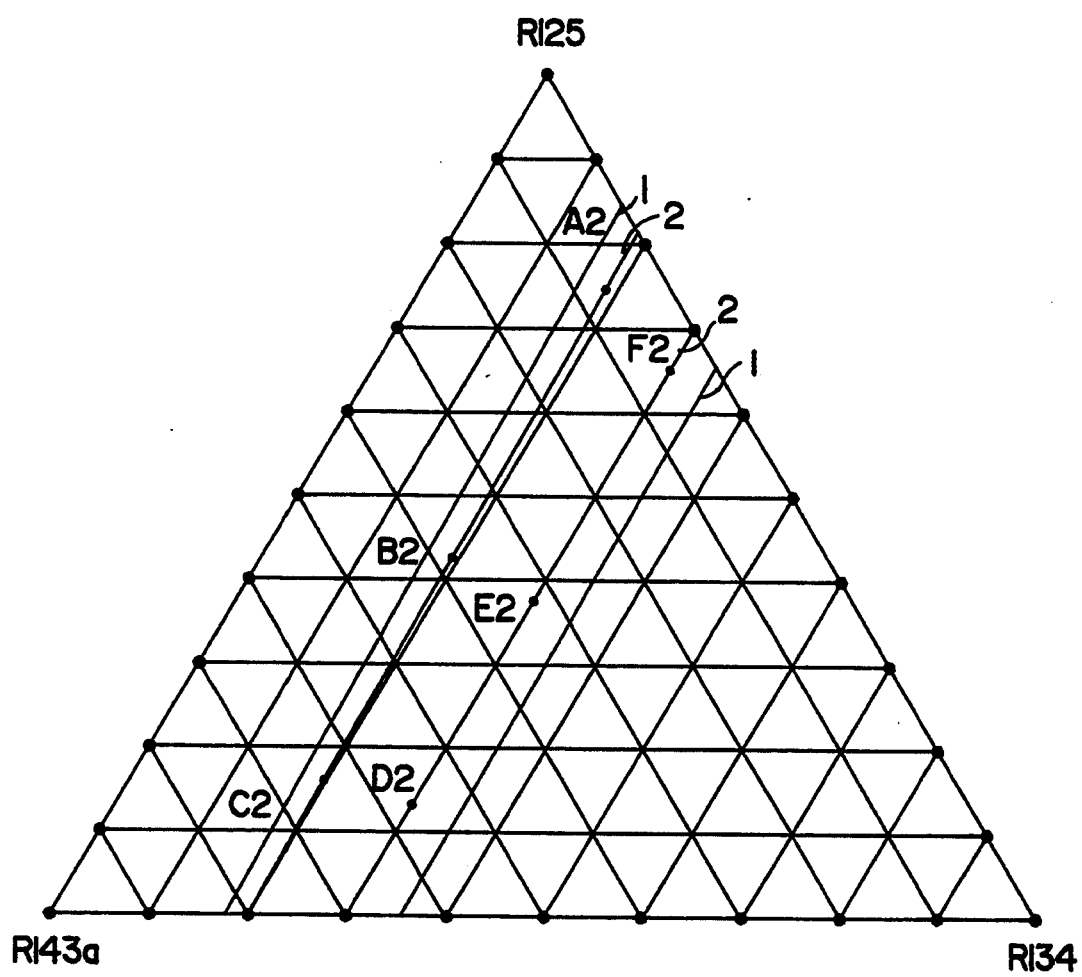

FIG. 12 shows a ternary composition diagram indicating equilibrium states of a mixture consisting of R125, R143a and R134 at specific temperatures under specific pressure in a triangular coordinate.

The compositions of the working fluids at the points A2 to F2 in FIG. 12 are shown in Table 12.

TABLE 12

| Point | A2 | B2 | C2 | D2 | E2 | F2 |
|---|---|---|---|---|---|---|
| R125 (wt. %) | 74.4 | 43.0 | 15.3 | 13.0 | 36.8 | 64.6 |
| R143a (wt. %) | 6.3 | 37.4 | 64.9 | 57.3 | 33.5 | 5.7 |
| R134 (wt. %) | 19.3 | 19.6 | 19.8 | 29.7 | 29.7 | 29.7 |

In this case, the mixture comprising about 0 to about 85% by weight (for example, about 1 to about 85% by weight) of R125, about 0 to about 80% by weight (for example, about 1 to about 80% by weight) of R143a and about 15 to about 35% by weight of R134 is preferred, and further, the mixture comprising about 0 to about 80% by weight (for example, about 1 to about 80% by weight) of R32, about 0 to about 80% by weight (for example, about 1 to about 80% by weight) of R143a and about 20 to about 30 % by weight of R134 is more preferred.

As understood from FIGS. 11 and 12, the mixture comprising about 0 to about 85% by weight (for example, about 1 to about 85% by weight) of R125, about 0 to about 80% by weight (for example, about 1 to about 80% by weight) of R143a and about 15 to about 45% by weight of tetrafluoroethane is preferred, since it has substantially the same vapor pressure as R22 in the utilization temperature between about 0° C. and about 50° C. Further, the mixture comprising about 0 to about 80% by weight (for example, about 1 to about 80% by weight) of R125, about 0 to about 80% by weight (for example, about 1 to about 80% by weight) of R143a and about 20 to about 45% by weight of tetrafluoroethane is more preferred, since it has substantially the same vapor pressure as R22 at all the utilizing temperature between 0° C. and 50° C.

Since the working fluids in Examples 11 and 12 are expected to have the ODP of 0 (zero), they are very promising as substitute working fluids for R22.

From the results of above Examples, the working fluid of the present invention preferably comprises 15 to 95% by weight of tetrafluoroethane and at least two fluorinated methane or ethane derivative selected from the group consisting of not more than 50% by weight of trifluoromethane, not more than 60% by weight of difluoromethane, not more than 85% by weight of pentafluoroethane and not more than 80% by weight of trifluoroethane. More preferably, the working fluid of the present invention comprises 20 to 90% by weight of tetrafluoroethane and at least two fluorinated methane or ethane derivatives selected from the group consisting of not more than 40% by weight of trifluoromethane, not more than 50% by weight of difluoromethane, not more than 80% by weight of pentafluoroethane and not more than 80% by weight of trifluoroethane.

In the above Examples, the mixtures contain three fluorinated halocarbons, although it is possible to mix four or more fluorinated halocarbons including structural isomers. In such case, preferably, the mixture comprises tetrafluoroethane as the first component and, as the second and third components two fluorinated halocarbons selected from the group consisting of trifluoromethane, difluoromethane, pentafluoroethane and trifluoroethane.

What is claimed is:

1. A working fluid which consists essentially of 15 to 95% by weight of tetrafluoroethane and two different fluorinated hydrocarbons having a boiling point not higher than −40° C. under atmospheric pressure selected from the group consisting of 1 to 50% by weight of trifluoromethane, 1 to 60% by weight of difluoromethane, 1 to 85% by weight of pentafluoroethane and 1 to 80% by weight of 1,1,1-trifluoroethane which has a composition in a range between phase equilibrium lines which are obtained when 0° C. is specified as a temperature and the same vapor pressure as that of chlorodifluoromethane at 0° C. is specified as a vapor pressure or a range between phase equilibrium lines which are obtained when 50° C. is specified as a temperature and the same vapor pressure as that of chlorodifluoromethane at 50° C. is specified as a vapor pressure.

2. The working fluid as claimed in claim 1, which consists essentially of 20 to 90% by weight of tetrafluorethane and two different fluorinated hydrocarbons selected from the group consisting of 1 to 40% by weight of trifluoromethane, 1 to 50% by weight of difluoromethane, 1 to 80% by weight of pentafluoroethane and 1 to 80% by weight of 1,1,1-trifluoroethane.

3. The working fluid as claimed in claim 1, which consists essentially of 40 to 95% by weight of tetrafluoroethane, 1 to 50% by weight of trifluoromethane and 1 to 60% by weight of difluoromethane.

4. The working fluid as claimed in claim 3, which consists essentially of 50 to 90% by weight of tetrafluoroethane, 1 to 40% by weight of trifluoromethane and 1 to 50% by weight of difluoromethane.

5. The working fluid as claimed in claim 1, which consists essentially of 15 to 95% by weight of tetrafluoroethane, 1 to 50% by weight of trifluoromethane and 1 to 85% by weight of pentafluoroethane.

6. The working fluid as claimed in claim 5, which consists essentially of 20 to 90% by weight of tetrafluoroethane, 1 to 40% by weight of trifluoromethane and 1 to 80% by weight of pentafluoroethane.

7. The working fluid as claimed in claim 1, which consists essentially of 20 to 95% by weight of tetrafluoroethane, 1 to 50% by weight of trifluoromethane and 1 to 80% by weight of 1,1,1-trifluoroethane.

8. The working fluid as claimed in claim 7, which consists essentially of 20 to 90% by weight of tetrafluoroethane, 1 to 40% by weight of trifluoromethane and 1 to 80% by weight of 1,1,1-trifluoroethane.

9. The working fluid as claimed in claim 1, which consists essentially of 15 to 80% by weight of tetrafluoroethane, 1 to 60% by weight of difluoromethane and 1 to 85% by weight of pentafluoroethane.

10. The working fluid as claimed in claim 9, which consists essentially of 20 to 75% by weight of tetrafluoroethane, 1 to 50% by weight of difluoromethane and 1 to 80% by weight of pentafluoroethane.

11. The working fluid as claimed in claim 1, which consists essentially of 20 to 80% by weight of tetrafluoroethane, 1 to 60% by weight of difluoromethane and 1 to 80% by weight of 1,1,1-trifluoroethane.

12. The working fluid as claimed in claim 11, which consists essentially of 20 to 75% by weight of tetrafluoroethane, 1 to 50% by weight of difluoromethane and 1 to 80% by weight of 1,1,1-trifluoroethane.

13. The working fluid as claimed in claim 1, which consists essentially of 15 to 45% by weight of tetrafluoroethane, 1 to 85% by weight of pentafluoroethane and 1 to 80% by weight of 1,1,1-trifluoroethane.

14. The working fluid as claimed in claim 13, which consists essentially of 20 to 45% by weight of tetrafluoroethane, 1 to 80% by weight of pentafluoroethane and 1 to 80% by weight of 1,1,1-trifluoroethane.

* * * * *

UNITED STATES PATENT AND TRADEMARK OFFICE
CERTIFICATE OF CORRECTION

PATENT NO. : 5,370,811
DATED : December 6, 1994
INVENTOR(S) : Yuji YOSHIDA et al.

It is certified that error appears in the above-indentified patent and that said Letters Patent is hereby corrected as shown below:

Please correct Fig. 7 as follows:

Change the component at the top of the figure from "R23" to --R32--.

Signed and Sealed this

Twenty-ninth Day of October 1996

Attest:

BRUCE LEHMAN

*Attesting Officer*     *Commissioner of Patents and Trademarks*